US012741244B2

(12) United States Patent
Paul et al.

(10) Patent No.: US 12,741,244 B2
(45) Date of Patent: Sep. 22, 2026

(54) ADAPTER ELEMENT AND RETAINING DEVICE FOR AN AIR/OIL SEPARATOR OF A VACUUM PUMP

(71) Applicant: BUSCH PRODUKTIONS GMBH, Maulburg (DE)

(72) Inventors: Andreas Paul, Maulburg (DE); Ronald Sachs, Schopfheim (DE); Marcus Posniak, Bad Säckingen (DE); Rainer Söll, Schopfheim (DE)

(73) Assignee: BUSCH PRODUKTIONS GMBH, Maulburg (DE)

( * ) Notice: Subject to any disclaimer, the term of this patent is extended or adjusted under 35 U.S.C. 154(b) by 819 days.

(21) Appl. No.: 18/019,852

(22) PCT Filed: Oct. 14, 2020

(86) PCT No.: PCT/EP2020/078907

§ 371 (c)(1),
(2) Date: Feb. 6, 2023

(87) PCT Pub. No.: WO2022/075891

PCT Pub. Date: Apr. 21, 2022

(65) Prior Publication Data

US 2023/0302388 A1 Sep. 28, 2023

(51) Int. Cl.
*B01D 46/00* (2022.01)

(52) U.S. Cl.
CPC ....... *B01D 46/0005* (2013.01); *B01D 46/003* (2013.01); *B01D 2265/021* (2013.01);
(Continued)

(58) Field of Classification Search
CPC ............ B01D 46/0005; B01D 46/2411; B01D 46/2414; B01D 2265/021;
(Continued)

(56) References Cited

U.S. PATENT DOCUMENTS

| | | | | |
|---|---|---|---|---|
| 2009/0241489 | A1* | 10/2009 | Becker | B01D 45/06 55/320 |
| 2018/0250617 | A1* | 9/2018 | Morris | F16N 39/06 |
| 2020/0155988 | A1* | 5/2020 | Campbell | B01D 46/2414 |

FOREIGN PATENT DOCUMENTS

| | | | |
|---|---|---|---|
| WO | 2013017921 | A1 | 2/2013 |
| WO | 2015153363 | A1 | 10/2015 |
| WO | 2018197614 | A1 | 11/2018 |

OTHER PUBLICATIONS

International Search Report in PCT/EP2020/078907 (with translation) dated Jun. 30, 2021, 7 pages.

(Continued)

*Primary Examiner* — Robert Clemente
(74) *Attorney, Agent, or Firm* — Tucker Ellis LLP

(57) ABSTRACT

The present invention relates to an adapter element (11) for a holding device for an air de-oiling element of a vacuum pump (1), comprising a first cylindrical portion (11*a*) having a first diameter and a second cylindrical portion (11*b*) having a second diameter and adapted to receive the air de-oiling element (2), whereby the first diameter is equal to or smaller than the second diameter and whereby the second cylindrical portion (11*b*) has circumferential recesses which form at least three fixing fingers (11*e*) aligned parallel to the longitudinal axis of the adapter element and distributed uniformly or non-uniformly over the circumference of the second cylindrical section (11*b*), wherein at least two fixing fingers (11*f*) are mounted so as to be elastically radially displaceable. The present invention also relates to a holding device (10) for an air de-oiling element (2) of a vacuum pump (1), in particular an oil vacuum pump.

15 Claims, 5 Drawing Sheets

(52) U.S. Cl.
CPC .... *B01D 2265/029* (2013.01); *B01D 2265/05* (2013.01); *B01D 2271/027* (2013.01)

(58) Field of Classification Search
CPC ........ B01D 2265/029; B01D 2271/027; B01D 46/003; B01D 46/0031; B01D 2265/05
See application file for complete search history.

(56) References Cited

OTHER PUBLICATIONS

Written Opinion in PCT/EP2020/078907 (with translation) dated Jun. 30, 2021, 9 pages.

* cited by examiner

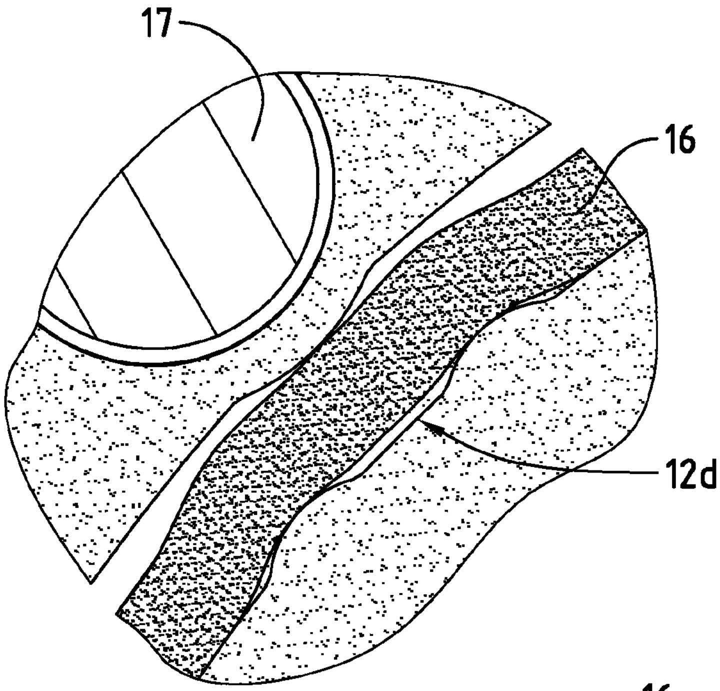
FIG. 4a
FIG. 4
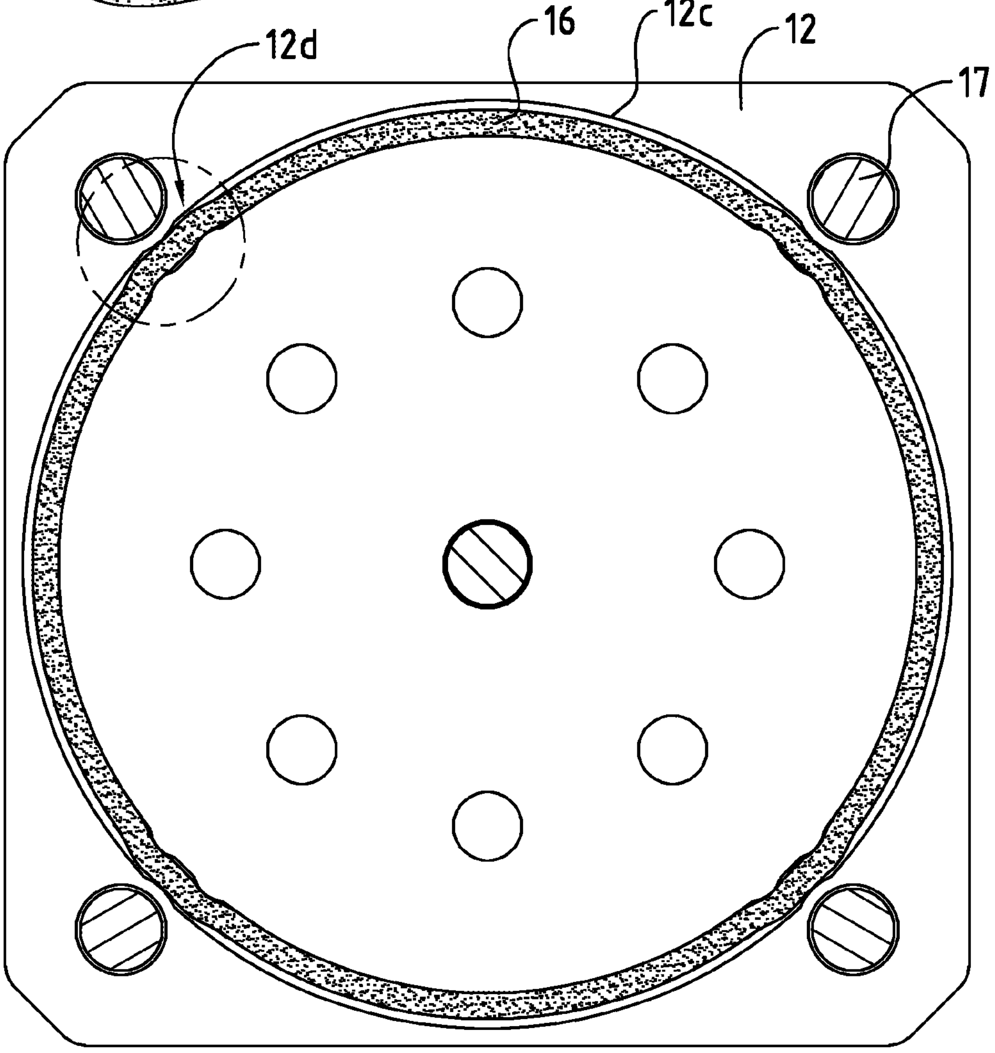

ADAPTER ELEMENT AND RETAINING DEVICE FOR AN AIR/OIL SEPARATOR OF A VACUUM PUMP

TECHNICAL FIELD OF THE INVENTION

The present invention relates to an adapter element for a holding device for an air de-oiling element of a vacuum pump, in particular an oil-sealed vacuum pump, hereinafter referred to as oil vacuum pump. The present invention also relates moreover to a holding device for an air de-oiling element of a vacuum pump. The present invention relates specifically to such an adapter element and such a holding device, which allow a quick and easy assembly and replacement of the air de-oiling element, in particular in confined spaces.

STATE OF THE ART

In vacuum pumps, in particular in oil vacuum pumps, such as rotary vane pumps, the fluid conveyed by the pump, which consists of a mixture of lubricant and gas, must be filtered before leaving the pump. In the further course, the term air will be used instead of fluid for easier understanding. By means of suitable air de-oiling elements the lubricant is led back into the lubrication system and the remaining purified air is expelled. The air de-oiling elements, which are held in the pumps with adapter elements and holders designed for this purpose, must be changed at regular intervals, since they otherwise lose their filtering capacity over time.

With known pumps and holding devices, the replacement of the air de-oiling elements is time-consuming. In particular, in so doing, some components connected to the air de-oiling element often need to be disassembled. These components are then needed again for the assembly and installation of the new air de-oiling element. On the one hand, this is time-consuming, and, on the other hand, it is often associated with contamination, since the components are covered with lubricant. Above and beyond this, the known adapter elements, i.e. the elements of the holding devices that create the connection between the air de-oiling element and the holding device, are too rigid to allow for an easy assembly.

The international application WO 2018/197614 proposes a holding device for an air de-oiling element which partially solves the above-mentioned difficulties. Although this device allows a somewhat easier installation of the air de-oiling element than other known devices and, above all, prevents contamination, simple installation is not always possible with this device. Assembly of the air de-oiling element with this device, and the other known devices, is very difficult, especially in very confined spaces, which often require assembly with a single hand. If there is restricted installation space for the vacuum pump, especially in the direction in which the air de-oiling element is to be led out of the pump during replacement, it is difficult or very time-consuming to carry out the activities required for the replacement and to check the correct position of the parts after completed re-installation. In addition, international application WO 2018/197614 discloses an adapter element that rigidly co-operates with the air de-oiling element, which further complicates assembly.

Starting from the state of the art, the present invention has as a basis the object to overcome the aforementioned disadvantages of the known devices and to propose an adapter element as well as a holding device for an air de-oiling element for vacuum pumps, in particular for oil vacuum pumps, which makes possible an easy assembly and replacement of the air de-oiling element.

SUMMARY OF INVENTION

In particular the object of the present invention is achieved according to a first aspect of the invention by an adapter element for a holding device for an air de-oiling element of a vacuum pump, comprising a first cylindrical portion having a first diameter and a second cylindrical portion having a second diameter and adapted to receive the air de-oiling element, whereby the first diameter is equal to or smaller than the second diameter, whereby the second cylindrical portion has circumferential recesses which form at least three fixing fingers aligned parallel to the longitudinal axis of the adapter element and distributed uniformly or non-uniformly over the circumference of the second cylindrical section, and whereby at least two fixing fingers are mounted so as to be elastically radially displaceable.

Thanks to the adapter element according to the present invention it is possible to mount the holding device and the air de-oiling element very easily. In particular the presence of at least two elastic and radially displaceable fixing fingers makes assembly and disassembly particularly easy and secure. Above and beyond this, the adapter element can be formed in a space-saving way. The circumferential recesses allow optimal circulation of the air exiting from air de-oiling elements. No excess pressure can thereby build up between the air de-oiling element and the adapter element, which would impair the proper functioning of the pump.

In a first preferred embodiment of the first aspect of the present invention, the diameter of the first cylindrical portion is smaller than the diameter of the second cylindrical portion, and the adapter element has a conical portion between the first cylindrical portion and the second cylindrical portion. This has the advantage that the flow-relevant cross section of the adapter is reduced and the air to be expelled is guided to the outlet holes without additional flow losses.

In a second preferred embodiment of the first aspect of the present invention, the conical portion of the adapter element has at least one, advantageously at least three, preferably at least five, circumferential recesses. The circulation of the air exiting the air de-oiling element is even further improved. For larger dimensions in particular, the number of recesses should be increased to six or more for reasons of strength or stability of the adapter element.

According to a second aspect, the objects of the present invention are also achieved by a holding device for an air de-oiling element of a vacuum pump, in particular an oil vacuum pump, comprising:

- an adapter element for receiving an air de-oiling element;
- an exhaust cover, the exhaust cover being attachable to the housing of the vacuum pump for sealing an exhaust hole; and
- a spiral spring arranged between adapter element and exhaust cover;
- whereby the holding device comprises limiting means for limiting the distance between the adapter element and the exhaust cover.

Thanks to such a structure of the holding device according to the invention, the assembly of the air de-oiling element and the holding device with respect to the housing of the vacuum pump is particularly easy. The limiting means ensure that the exhaust cover and the adapter element form a unit so that the two elements cannot separate from each other during assembly. Such a device is particularly advantageous in situations where the space relations for mounting are very tight, which is the case, for example, when the pump is installed in a pumping unit. In such cases it is especially important that the assembly can be done with only one hand. Above and beyond this, and thanks to the spiral spring, optimal pressure can be applied to the air de-oiling element so that this element is properly held and supported in the housing. A spring-loaded mounting of the air de-oiling element is important in order to be able to dampen the vibrations of the pump and to compensate for the production-related dimensional variations inherent in the parts.

In a first preferred embodiment of the second aspect of the present invention, the adapter element is an adapter element according to the first aspect of the present invention. Thus the orientation of the holder in relation to the pump housing and the air de-oiling element is unimportant for the assembly, which simplifies it even further.

In a second preferred embodiment of the second aspect of the present invention, the adapter element, exhaust cover and spiral spring are arranged coaxially. Thus the orientation of the holder in relation to the pump housing and the air de-oiling element is unimportant for the assembly, which simplifies it even further.

In another preferred embodiment of the second aspect of the present invention, the adapter element is freely rotatable relative to the exhaust cover. This allows the orientation of the adapter element to be adapted to the exact geometry of the air de-oiling element. This is important in cases where the air de-oiling element is either not symmetrical or where it has means to prevent incorrect installation.

In a further preferred embodiment of the second aspect of the present invention, the limiting means are in the form of a screw, the screw head of which is arranged on the air side of the exhaust cover and which comprises locking means on its cylindrical body on the side opposite the screw head, preferably detachable locking means. A screw is an especially simple embodiment for the limiting means. In addition, detachable locking means are particularly advantageous, as this allows the holding device to be designed as a kit. The adapter element or the spiral spring can therefore be replaced if necessary. The adapter element can therefore also be selected according to the exact design of the air de-oiling element. The spiral spring can be replaced if, for example, it can no longer fulfill its spring function as desired.

In a further preferred embodiment of the second aspect of the present invention, the distance between locking means and exhaust cover is adjustable. The holding device can thereby be adapted to the geometry of the pump housing and the preload of the spiral spring can also be adjusted. The adjustment of the distance between the locking means and the exhaust cover can be realized by means of a suitable component, such as a lock nut, for example.

In another preferred embodiment of the second aspect of the present invention, the locking means are in the form of an O-ring. An O-ring has the advantage that it is inexpensive and easy to mount or respectively to replace. Above and beyond this, an O-ring also has a certain elasticity, which can be advantageous with relaxed spiral spring.

In still another preferred embodiment of the second aspect of the present invention, the holding device comprises, between screw head and exhaust cover, a rubbery-elastic plate, preferably of an elastomer and between screw head and rubbery-elastic plate an exhaust cover spring, advantageously in the form of a spider spring. Thanks to the exhaust cover spring, the rubbery-elastic plate can be pressed on the exhaust cover in such a way that the exhaust holes in the exhaust cover are closed off. A spider spring has the advantage that the contact pressing force of the spring is uniformly distributed to a multiplicity of points on a circular line on the rubbery-elastic plate. The rubbery-elastic plate has the advantage that the outflowing air can open the plate from the exhaust cover to open the exhaust holes, and plate can return to the original position under the effect of the spring force of the exhaust cover spring in order to close the exhaust holes again. No relative movement of the parts to one another is thereby required, which excludes mechanical wear on the parts.

In another preferred embodiment of the second aspect of the present invention, the exhaust cover has a groove on its vacuum side for receiving an O-ring, wherein the groove is formed in such a way that an O-ring inserted in the groove cannot become detached from the exhaust cover. The assembly is thereby especially simplified. When mounting a holding device for an air de-oiling element, especially in confined spaces, it is particularly advantageous if it can be ensured that the O-ring cannot become detached from the exhaust cover during the movements and forces that normally occur during mounting or assembly.

In still another preferred embodiment of the second aspect of the present invention, the groove is chicane-shaped or baffled in at least two places. A chicane-shaped or baffled groove ensures that the O-ring cannot come loose from the groove during the usual movements and forces that occur during assembly, without the shape of the groove affecting the sealing ability of the O-ring.

Further details of the invention will emerge from the description which now follows of the preferred embodiment of the invention, which is represented in the attached drawings. The further advantages of the present invention can be learned from the description and suggestions and proposals can be learned as to how the subject matter of the invention could be modified or also further developed within the scope of what is claimed.

BRIEF DESCRIPTION OF THE DRAWINGS

FIG. 4 shows the exhaust cover of the holding device according to the preferred embodiment of the present invention;

FIG. 4*a* shows a detail view of the exhaust cover of the holding device according to the preferred embodiment of the present invention.

PREFERRED EMBODIMENTS OF THE INVENTION

Figure 1:
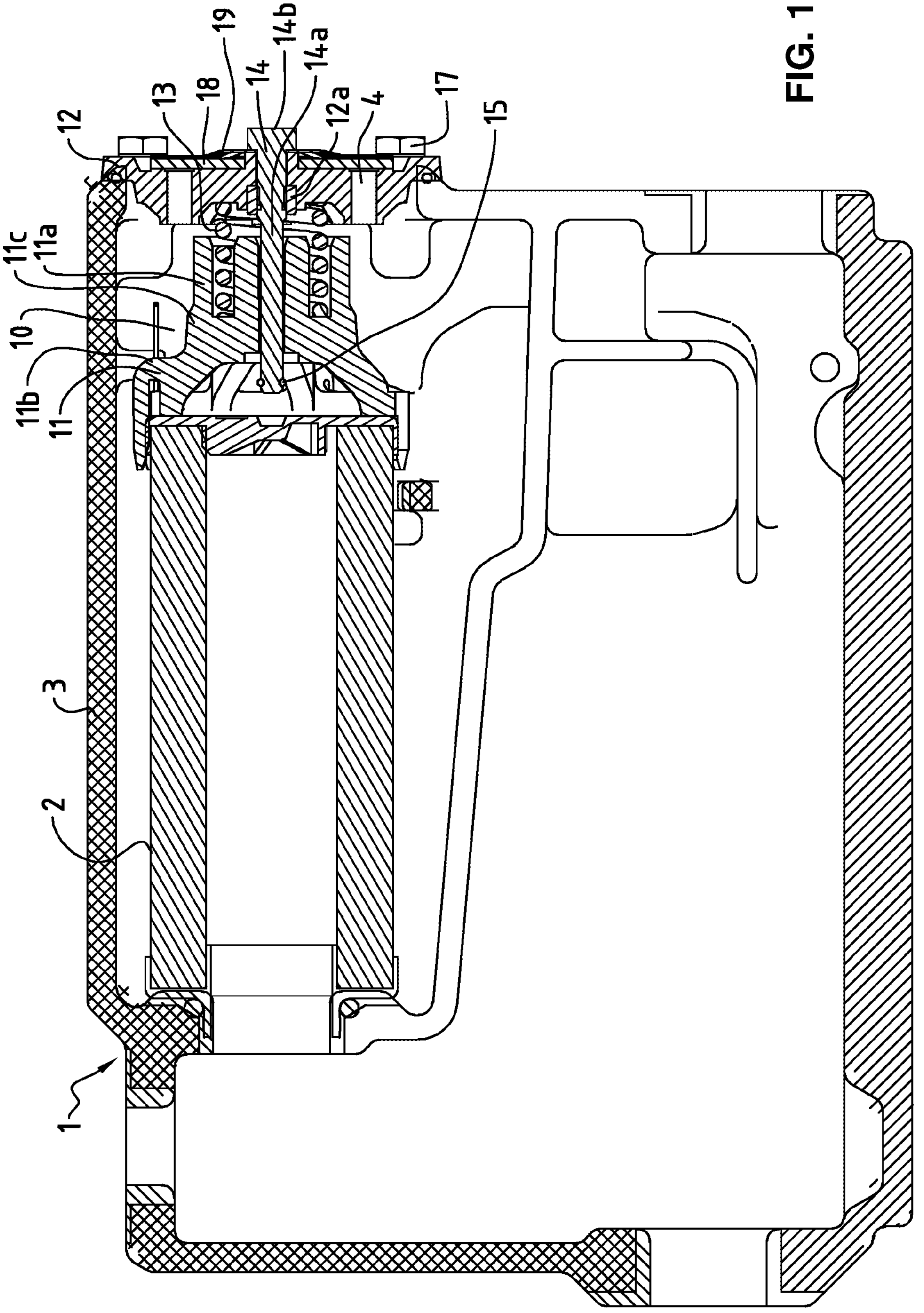
FIG. 1 shows a sectional view of a vacuum pump, an adapter element and a holding device for an air de-oiling element according to a preferred embodiment of the holding device and of the adapter element of the present invention.
Figure 2:
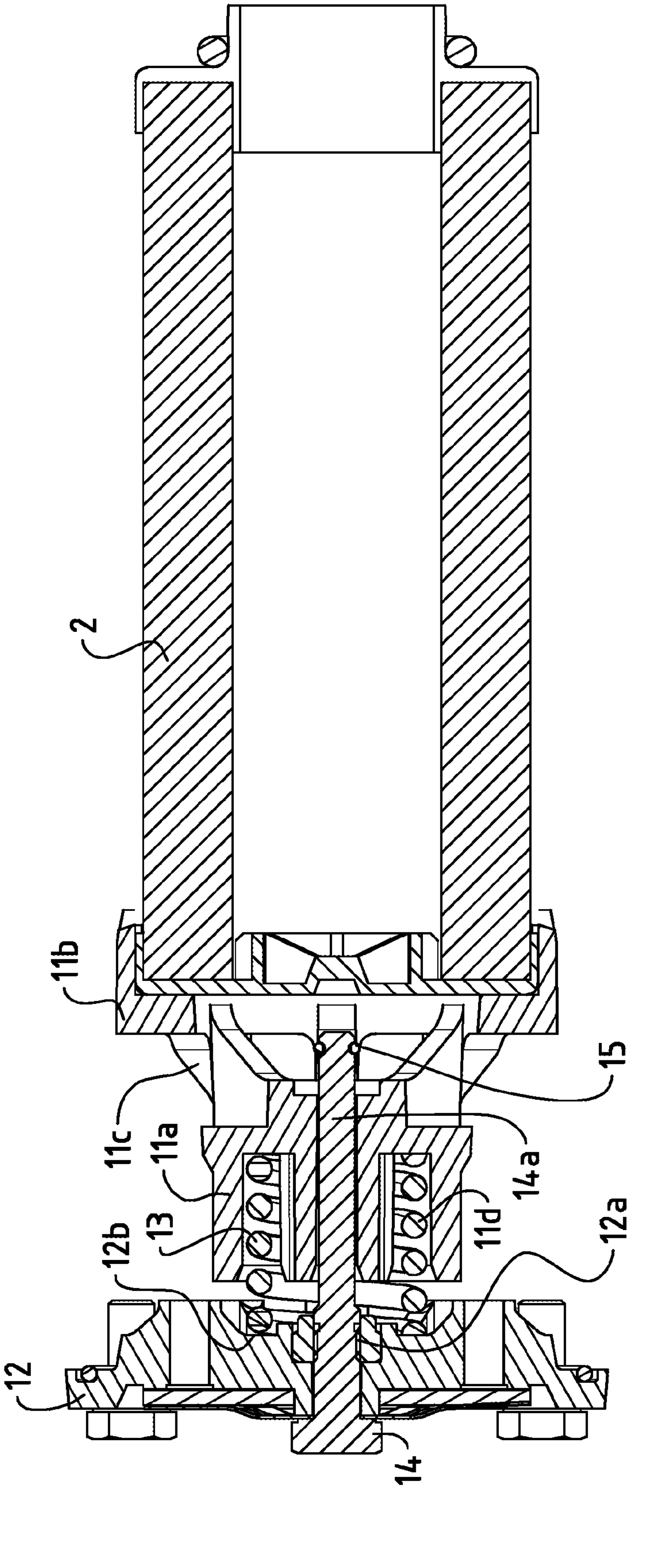
FIG. 2 shows a sectional view of an air de-oiling element, an adapter element and a holding device according to the preferred embodiment of the present invention.

FIG. 1 shows a sectional view of a vacuum pump 1 with an air de-oiling element 2 and a holding device 10 according to a preferred embodiment of the present invention. The holding device 10 is designed in such a way that it holds the air de-oiling element firmly and at the same time enables its replacement.

The holding device 10 comprises in this embodiment an adapter element 11 for receiving the air de-oiling element 2 according to the present invention. It is important to note, however, that the holding device may also comprise an adapter element known from the state of the art instead of an adapter element according to the present invention. Details about the adapter element will be explained further below.

The holding device 10 comprises furthermore an exhaust cover 12 for sealing off an exhaust hole 4 in the housing 3 of the pump 1 and a spiral spring 13 arranged between the adapter element 11 and the exhaust cover 12. Provided furthermore are limiting means 14, here in the form of a screw, in order to limit the maximal distance between the adapter element 11 and the exhaust cover 12. For this purpose the screw 14 has on its cylindrical body 14*a* locking means 15, here in the form of an O-ring. In the embodiment illustrated here, the O-ring is disposed in a groove, designed therefor, in the cylindrical body 14*a* of the screw 14. The advantage of an O-ring lies in that it is very easily separable from the screw 14, which facilitates the disassembly of the holding device 10. It is important to note that the maximal distance between the adapter element 11 and the exhaust cover 12 can preferably be adjusted by means of a suitable component (not shown here), for example a lock nut.

The adapter element 11 is preferably freely rotatable about the cylindrical body 14*a* of the screw 14. The rotational position of the adapter element 11 with respect to the air de-oiling element 2 can thereby be adjusted. This is particularly advantageous if the adapter element 11 must necessarily assume a certain rotational position relative to the air de-oiling element 2 when attaching the holding device 10 to the pump 1.

Thanks to the spiral spring 13 and the exhaust cover 12, the holding device 10 can press against the air de-oiling element 2 with the necessary contact pressure, so that the air de-oiling element 2 is securely mounted in the housing 3 of the pump 1.

Figure 3:
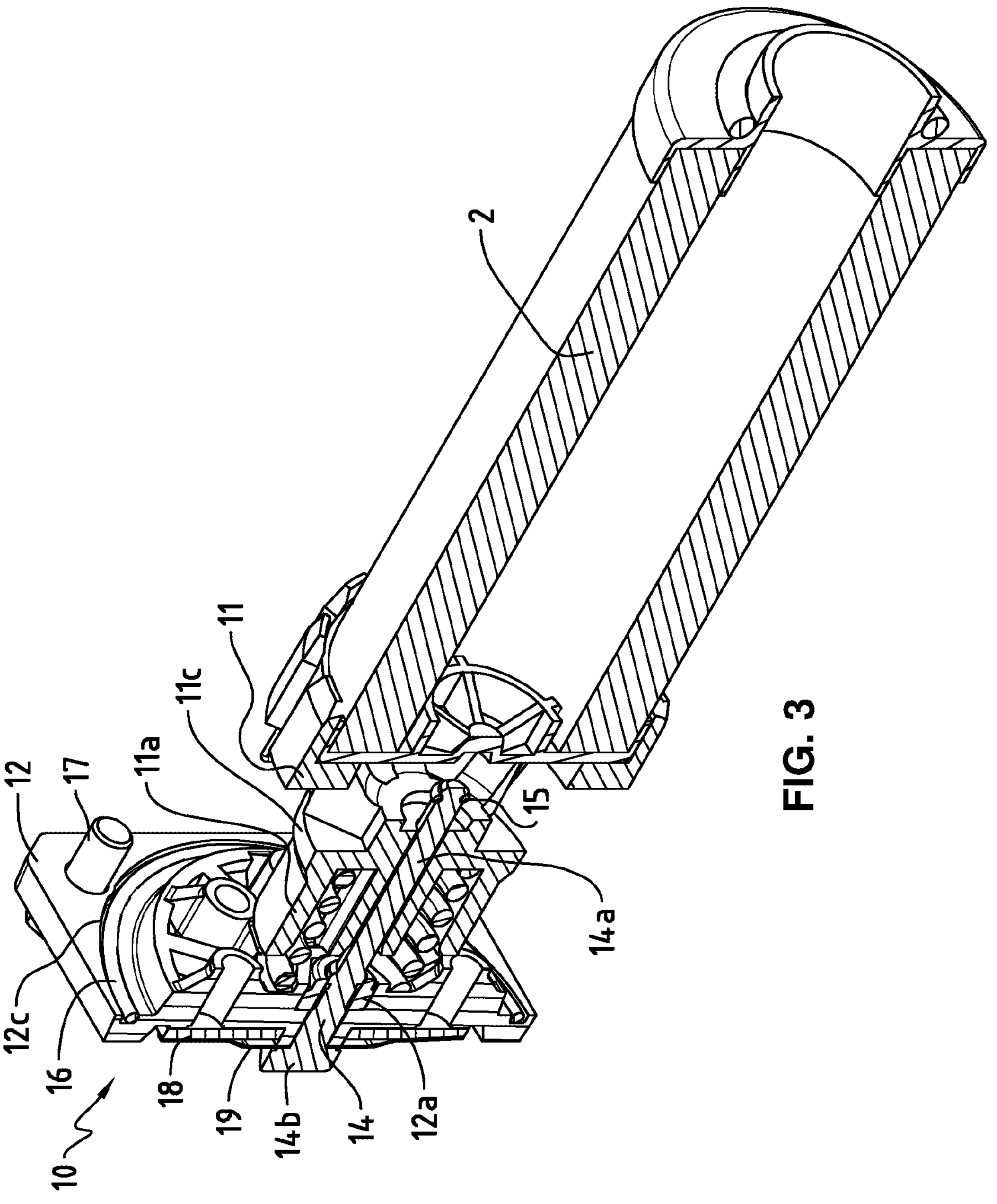
FIG. 3 shows a perspective sectional view of an air de-oiling elements, an adapter element and a holding device according to the preferred embodiment of the present invention.

As can best be seen from FIG. 3, the exhaust cover 12 has a groove 12*c* for receiving an O-ring 16. Furthermore, retaining screws 17 are provided for fastening the holding device 10 to the housing 3 of the pump 1.

FIG. 4 shows the vacuum side of the exhaust cover 12 in more detail. Advantageously, the groove 12*c* for receiving the O-ring 16 is chicane-shaped or baffled in at least two places, here there are four (see also FIG. 4*a*). Thanks to these chicane-shaped or baffled places 12*d*, the O-ring 16 is held in the groove 12*c* and cannot detach itself from the exhaust cover 12. The holding of the O-ring 16 in place allows for easy mounting of the holding device 10 to the housing 3, since the risk of the O-ring 16 falling off is greatly reduced.

Figure 5:
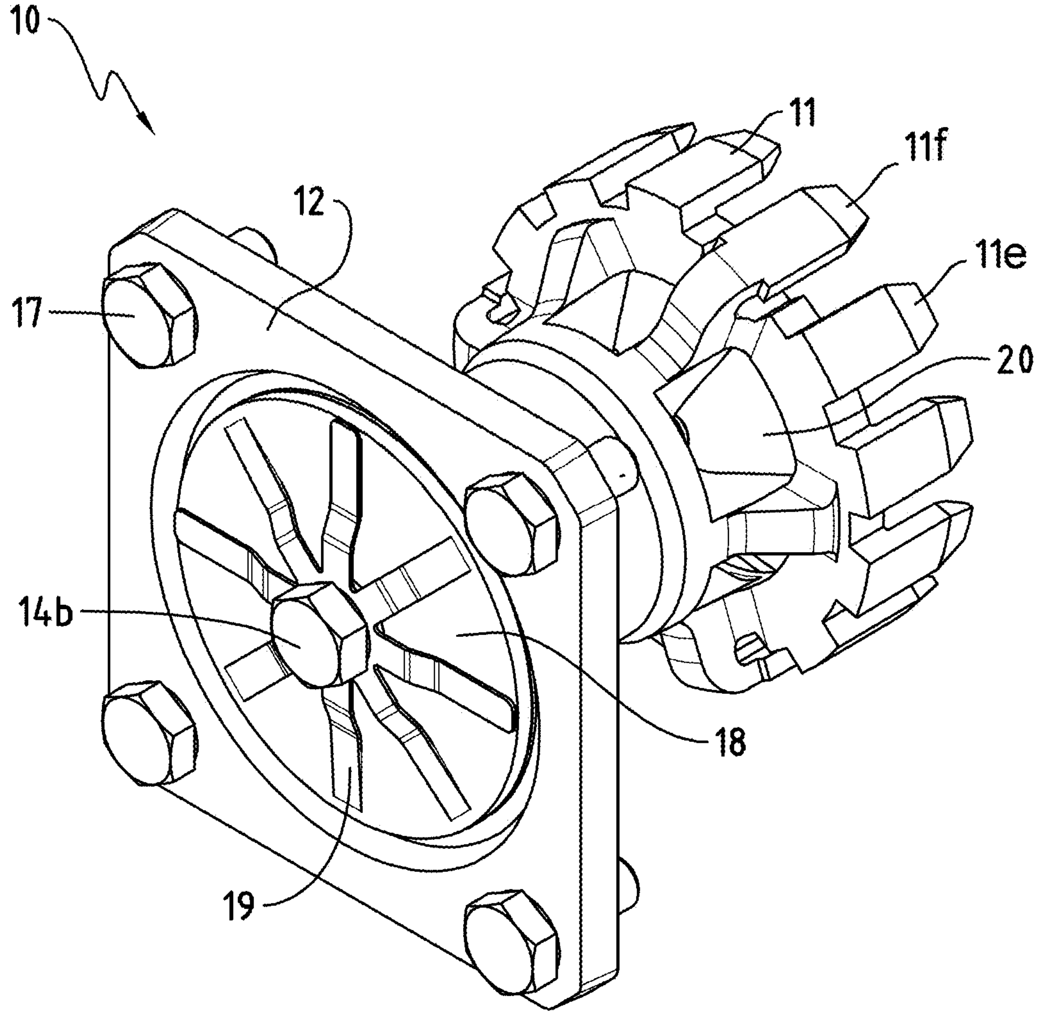
FIG. 5 shows a perspective view of the adapter element and the holding device according to the preferred embodiment of the present invention.

As shown in FIG. 5, the holding device 10 has a plate of elastomer 18 and a spider spring 19 between the screw head 14*b* of the screw 14 and the exhaust cover 12. The spider spring 19 has the advantage that the pressing force of the spring is uniformly distributed over a multiplicity of points on a circular line on the rubbery-elastic plate 18. The plate 18 made of elastomer, in turn, has the advantage that the outflowing air can open the plate from the exhaust cover in order to open the exhaust holes, and the plate can return to the original position under the effect of the spring force of the spider spring 19 in order to close the outlet holes again. No relative movement of the parts to each other is thereby required, which excludes mechanical wear of the parts.

In the preferred embodiment shown in FIGS. 1 to 5, the adapter element 11 comprises a first cylindrical portion 11*a* and a second cylindrical portion 11*b*, and a conical section 11*c* between the two cylindrical portions. The second cylindrical portion 11*b* has recesses forming fixing fingers 11*e*. The fixing fingers 11*e* allow the receiving of the air de-oiling element 2, and the recesses allow a better circulation of the air coming out of the filter. At least two, in this embodiment four, fixing fingers 11*f* are elastically mounted in a radially displaceable way.

These fixing fingers 11*f* are advantageously inclined with respect to the longitudinal axis of the adapter element 11 when the air de-oiling element 2 is not present. When the air de-oiling element 2 is inserted into the adapter element 11, the fixing fingers 11*f* are then moved radially outwards. This makes possible an easy receiving of the air de-oiling element by the adapter element and at the same time ensures an optimal hold. Furthermore, the elastically mounted fixing fingers 11*f* dampen the vibrations occurring during operation of the pump. As can be seen from the Figures, the fixing fingers are beveled in order to allow an easy insertion of the air de-oiling element 2 into the adapter element 11.

As can be seen from FIG. 5, the conical portion 11*c* also has recesses 20 in order to allow better circulation of the air exiting from the air de-oiling element 2. Furthermore, the first cylindrical portion 11*a* of the adapter 11 advantageously has a recess 11*d* for receiving the spiral spring 13. The spiral spring 13 is thereby optimally guided and cannot become deformed in the radial direction. Similarly, the exhaust cover 12, preferably also has, for its part, a recess 12*b* for receiving the spiral spring 13.

It is important to note that both the adapter element 11 and the holding device 10 are inventive and advantageous by themselves, although they are always shown in combination in the Figures. In other words the adapter element 11 can also be used in combination with holding devices already known from the state of the art. The same applies for the holding device 10, which can also comprise, without further ado, an adapter element known from the state of the art. Although the holding device 10 and the adapter element 11 are advantageous in their own right, together they also have a synergistic effect. Indeed, the combination of an adapter element 11 with a holding device 10 according to the present invention makes possible a particularly easy assembly.

In conclusion, it is pointed out again that the embodiments described here by way of example represent only possibilities for realization of the inventive ideas and in no way should they be seen as limiting. One skilled in the art will understand that that other implementations of the invention and further elements are possible without losing sight of the essential features of the invention.

The invention claimed is:

1. Adapter element for a holding device for an air de-oiling element of a vacuum pump, comprising a first cylindrical portion having a first diameter and a second cylindrical portion having a second diameter and adapted to receive the air de-oiling element, the first cylindrical portion having an annular recess in a face thereof opposite the second cylindrical portion, wherein the first diameter is equal to or smaller than the second diameter and the second cylindrical portion has circumferential recesses which form at least three fixing fingers aligned parallel to a longitudinal axis of the adapter element and distributed uniformly or non-uniformly over a circumference of the second cylindrical section, wherein at least two of the fixing fingers are mounted so as to be elastically radially displaceable.

2. Adapter element according to claim 1, wherein the first diameter of the first cylindrical portion is smaller than the second diameter of the second cylindrical portion, and wherein the adapter element has a conical portion between the first cylindrical portion and the second cylindrical portion.

3. Adapter element according to claim 2, wherein the conical portion of the adapter element has at least one circumferential recess.

4. Holding device according to claim 3, wherein the conical portion of the adapter element has at least three circumferential recesses.

5. Holding device for an air de-oiling element of an oil vacuum pump, comprising:

an adapter element comprising:

a first cylindrical portion having a first diameter and a second cylindrical portion having a second diameter and adapted to receive the air de-oiling element, wherein the first diameter is equal to or smaller than the second diameter and the second cylindrical portion has circumferential recesses which form at least three fixing fingers aligned parallel to a longitudinal axis of the adapter element and distributed uniformly or non-uniformly over a circumference of the second cylindrical section, wherein at least two of the fixing fingers are mounted so as to be elastically radially displaceable;

an exhaust cover, the exhaust cover being attachable to a housing of the vacuum pump for sealing an exhaust hole;

a spiral spring arranged between the adapter element and the exhaust cover; and limiting means for limiting a distance between the adapter element and the exhaust cover.

6. Holding device according to claim 5, wherein the adapter element, the exhaust cover and the spiral spring are arranged coaxially.

7. Holding device according to claim 5, wherein the adapter element is freely rotatable relative to the exhaust cover.

8. Holding device according to claim 5, wherein the limiting means are in the form of a screw having a screw head arranged on an air side of the exhaust cover and comprising locking means on its cylindrical body on a side opposite the screw head.

9. Holding device according to claim 8, wherein a distance between the locking means and the exhaust cover is adjustable.

10. Holding device according to claim 8, wherein the locking means are in the form of an O-ring.

11. Holding device according to claim 8, comprising, between the screw head and the exhaust cover, a rubbery-elastic plate, and between the screw head and the rubbery-elastic plate an exhaust cover spring.

12. Holding device according to claim 8, wherein the exhaust cover has a groove on its vacuum side for receiving an O-ring, wherein the groove is formed in such a way that an O-ring inserted in the groove cannot become detached from the exhaust cover.

13. Holding device according to claim 12, wherein the groove is chicane-shaped or baffled in at least two places.

14. Holding device according to claim 8, said locking means being detachable locking means.

15. Holding device according to claim 11, said rubbery-elastic plate comprising an elastomer, said exhaust cover spring being a spider spring.

* * * * *